United States Patent [19]

Sugiura et al.

[11] 4,274,733

[45] Jun. 23, 1981

[54] COPYING APPARATUS WITH STATIONARY ORIGINAL SUPPORT TABLE AND NOVEL IMAGING LENS SYSTEM

[75] Inventors: Muneharu Sugiura, Tokyo; Setsuo Minami, Kawasaki, both of Japan

[73] Assignee: Canon Kabushiki Kaisha, Tokyo, Japan

[21] Appl. No.: 29,109

[22] Filed: Apr. 11, 1979

[30] Foreign Application Priority Data

Apr. 19, 1978 [JP] Japan .................................. 53/47084

[51] Int. Cl.³ .............................................. G03B 27/34
[52] U.S. Cl. ............................................ 355/60; 355/8
[58] Field of Search ..................................... 355/55–63, 355/49, 8; 354/150; 350/183, 184, 186, 187

[56] References Cited

U.S. PATENT DOCUMENTS

| 3,436,145 | 4/1969 | Bechtold | 355/55 |
| 3,537,373 | 11/1970 | Land | 354/150 |
| 3,687,522 | 8/1972 | Lynch et al. | 355/56 X |
| 3,709,602 | 1/1973 | Satomi | 355/57 X |
| 4,046,467 | 9/1977 | Laskowski et al. | 355/57 X |
| 4,118,118 | 10/1978 | Barto, Jr. | 355/57 X |

Primary Examiner—L. T. Hix
Assistant Examiner—W. J. Brady
Attorney, Agent, or Firm—Fitzpatrick, Cella, Harper & Scinto

[57] ABSTRACT

A copying apparatus comprising a flat stationary original support table, at least a movable mirror for scanning the surface of an original placed on said original support table, and an imaging optical system adapted for focusing the light beam from said movable mirror onto a photosensitive member and capable of compensating the change in the light path length from said original support table to the photosensitive member resulting from the displacement of said movable mirror while maintaining a constant image magnification.

5 Claims, 4 Drawing Figures

COPYING APPARATUS WITH STATIONARY ORIGINAL SUPPORT TABLE AND NOVEL IMAGING LENS SYSTEM

BACKGROUND OF THE INVENTION

The present invention relates to a copying apparatus utilizing a slit exposure system in which the image of a flat stationary original is focused onto a photosensitive member through a movable mirror performing a parallel displacement and a path-length compensating optical system.

As an exposure scanning system with a stationary original support table there is already known, as disclosed in the U.S. Pat. No. 3,330,181, a scanning system wherein the optical path length during the scanning is maintained constant by means of a first mirror displacing at a constant speed synchronized with the displacement of a photosensitive member, and of a second mirror performing a parallel displacement at a speed equal to a half of that of said first mirror while maintaining a predetermined positional relationship to said first mirror. However, this system is defective in requiring a complicated actuating mechanism, as said first and second mirrors have to be maintained in said mutual relationship during the scanning, and also in the possible undesirable effect of the mirror vibration on the image resolution on the photosensitive member, as the system involves two movable mirrors. On the other hand, in the U.S. Pat. No. 3,537,373 there is disclosed a scanning system in which a stationary original support table is scanned by a rotating planar mirror, and the change in the optical path length is compensated by means of an imaging lens. In this system, though it is rendered possible to simplify the actuating mechanism and to remove the undesirable effect of vibration because of the absence of displacing mirrors for scanning, an exact image cannot be obtained due to image distortion resulting from the scanning with a rotating mirror.

SUMMARY OF THE INVENTION

The object of the present invention is to provide a copying apparatus utilizing a stationary original support table wherein the optical path length can be maintained constant with a simple actuating mechanism and without the foregoing drawbacks.

Another object of the present invention is to provide a copying apparatus utilizing an optical system capable of maintaining a constant optical path length without image distortion.

The copying apparatus of the present invention is featured by at least a movable mirror for scanning the surface of an original placed on a stationary original support table, and an imaging optical system adapted for focusing the light beam from said movable mirror onto a photo-sensitive member and capable of compensating the change in the optical path length from the surface of the original to the photosensitive member resulting from the displacement of said movable mirror.

In case said movable mirror in the copying apparatus of the present invention is a planar mirror without a focusing power, said imaging optical system is provided with at least two movable lens groups to be displaced in synchronization with said movable mirror, wherein the magnification of the image of said original formed on said photosensitive member is maintained constant regardless of the displacement of said movable lens groups. Stated differently, said imaging optical system is adapted to perform compensation of the optical path length by displacing at least two lens groups contained therein in such a manner that the plane of the photosensitive member is always optically conjugate with the plane of the original while maintaining a constant image magnification.

Also in case said movable mirror in the copying apparatus of the present invention is provided with a certain focusing power, said imaging optical system is provided with at least a movable lens group to be displaced in synchronization with said movable mirror for the purpose of compensating the optical path length and the image magnification.

In the copying apparatus of the present invention, said imaging optical system is further provided with a function of arbitrarily changing the image magnification, and said function is achieved by displacing another lens group or interchanging said another lens group with still another lens group.

Thus, the present invention allows the scanning of the original with only one movable mirror, simplifying the actuating mechanism and avoiding the effect of vibration on the image resolution. Also the image distortion can be prevented as the scanning is achieved with a slit exposure system with a displacing mirror.

The present invention will become fully apparent from the following description taken in conjunction with the attached drawings.

DESCRIPTION OF THE PREFERRED EMBODIMENTS

Figure 1:
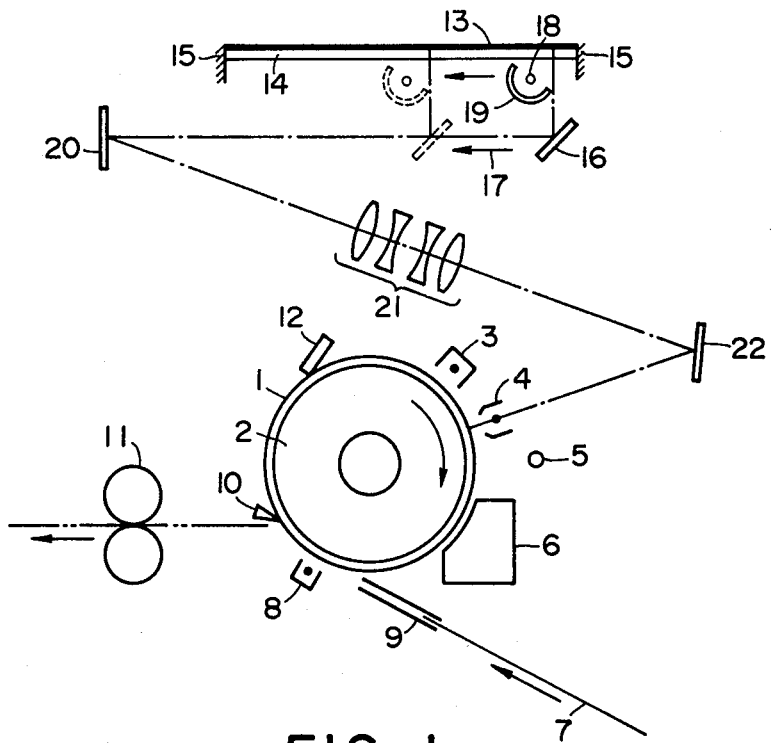
FIG. 1 is a schematic view of a copying apparatus embodying the present invention.

FIG. 1 shows, in a schematic view, a copying apparatus embodying the present invention, wherein a drum 2 provided on the periphery thereof with a photosensitive member 1 consisting of an electroconductive substrate, a photoconductive layer and a transparent surfacial insulating layer laminated in succession is supported in a predetermined position and rotated by an unrepresented motor at a predetermined speed and in a direction indicated by the arrow. The rotating speed of said drum 2 is maintained constant for every imaging magnification. The surface of the photosensitive member 1 is at first uniformly charged with a DC corona discharger 3, then subjected to a slit exposure of the image of the original through an optical system to be explained later, in combination with an AC corona discharge or a DC corona discharge of a polarity opposite to that of the above-mentioned corona discharger 3, said discharge being performed by another corona discharger 4 provided with a slit aperture for transmitting the imaging light beam, and finally illuminated uniformly by a flush exposure lamp 5 to form an electrostatic latent image of an elevated contrast on said surface. Said latent image is rendered visible by the toner supplied, for example, from a magnetic brush in a developing station 6, and the visible toner image thus obtained is transferred onto a transfer sheet 7 advanced at the same speed as the peripheral speed of the drum 2 under a discharge of a polarity opposite to that of the toner supplied to the rear side of said transfer sheet from a corona discharger 8. Said transfer sheet 7 is supplied one by one from an unrepresented casette in synchronization with the rotation of the drum 2, then brought into contact with the photosensitive member 1 through a guide 9, peeled therefrom by a claw 10 and transported by a known transporting mechanism. The toner image carried by the transfer sheet 7 is fixed thereto, for example, by a heat roller in a fixing station 11. On the other hand the toner remaining on the surface of the photosensitive member 1 after the image transfer is removed, for example, by a rubber blade maintained in pressure contact with said photosensitive member 1 in a cleaning station 12, and the photosensitive member 1 thus cleaned is prepared ready for the succeeding image forming cycle.

The original to be copied 13 is statically placed on a transparent planar original support table 14, which is rendered stationary by fixing it to a fixed member 15 such as a side plate of the copying apparatus. Said original 13 is scanned by a planar movable mirror 16, which is displaced in the direction of the arrow 17, i.e. a direction parallel to said original support table 14 in synchronization with the rotation of the drum 2 when the photosensitive member 1 is exposed to the image of said original. Upon completion of the scanning of the original from one end to the other thereof, the displacement of the movable mirror 16 is terminated and reversed until it reaches a home position which is the start position for the succeeding forward displacement. A lamp 18 and a concave mirror 19 provided therebehind are supported by an unrepresented support member integrally with the movable mirror 16 to perform displacement therewith. Said lamp 18 is lighted only during the forward displacement of the movable mirror 16 and illuminates the original in cooperation with said concave mirror 19.

The light beam reflected by said original is introduced through the movable mirror 16 and a fixed mirror 20 into an imaging optical system 21, and focused by means of a mirror 22 onto the drum 2. Said imaging optical system 21 performs a function of compensating the change in the optical path length resulting from the displacement of the movable mirror 16, while maintaining a constant magnification of the image of the original 13 formed on the photosensitive member 1. Stated differently, even when the optical path length from the original to the imaging lens system 21 is varied by the displacement of said movable mirror 16, the image of said original is always formed on said drum, with a constant image magnification. In order to achieve such function, at least two of the lens groups constituting the imaging lens system 21 are displaced in synchronization with said movable mirror.

Figure 2:
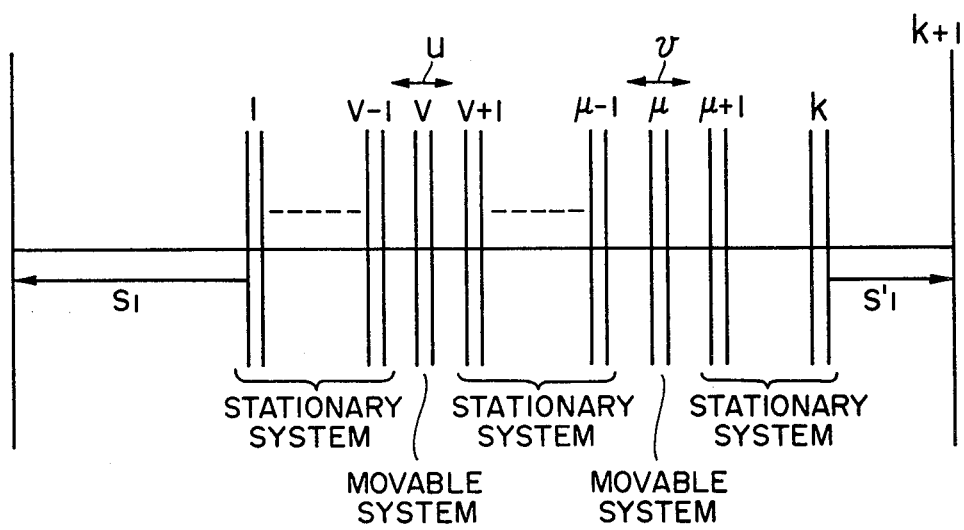
FIGS. 2 and 3 are views for explaining the imaging lens system for compensating the change in the optical path length.

Now in the following there will be explained the method of realizing a constant back-focus distance S1' and a constant image magnification $\beta$ in the imaging lens system 21 in spite of the object distance S1 thereof resulting from the displacement of the movable mirror 16, in an embodiment wherein two lens groups in said system are displaced. FIG. 2 is a schematic view of an imaging lens system 21 consisting of k lens groups respectively represented by the principal planes thereof, wherein the $\nu$-th lens group $\nu$ and the $\mu$-th lens group $\mu$ ($1 \leq \nu < \mu \leq k$) from the object side are rendered movable respectively over a distance u and v to perform compensation of the change in the optical path length.

Said distance u and v are considered positive or negative respectively in a displacement toward the image plane or a displacement in the opposite direction, and the initial state of the lens system is defined as a state wherein $u = v = 0$.

Figure 3:
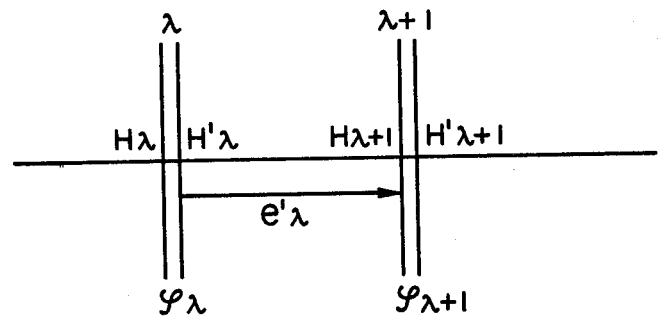

Also the refractive powers of said lens groups are represented by $\phi 1, \phi 2, \ldots, \phi \nu, \ldots, \phi \mu, \ldots, \phi k$, and the distances between said lens groups are represented in the same order by $e'1, e'2, \ldots, e'_{k-1}$. As shown in FIG. 3, $\phi \lambda$ ($\lambda = 1, \ldots, k$) is the reciprocal of the focal length of the $\lambda$-th lens group, and $e'\lambda$ ($\lambda = 1, \ldots, k-1$) is the distance from the rear principal point H'$\lambda$ of the $\lambda$-th lens group to the front principal point H$_{\lambda+1}$ of the ($\lambda+1$)-th lens group divided by the refractive index of the transmitting medium.

Also by representing the object plane and the image plane of the path-length compensating optical system respectively by the suffixes 0 and k+1, there can be introduced the following new definitions:

$$e'_0 \equiv -S_1, \quad d'_k = S'_1 \, (= const) \qquad (1)$$

whereby the object plane and the image plane can be regarded as components of refractive power zero in the optical system for easier mathematical consideration. Also the value of $e'_0$ when $u = v = 0$ is particularly defined as $e'_{00}$.

Since the paraxial imaging theory proves that either two of the factors $e'_{00}$, $e'_k$ and $\beta$ are automatically determined from the third factor for a given initial state, these factors have to be suitably selected so as to avoid contradiction in the designing of the initial state of the path-length compensating optical system.

In the following there will be explained the method of determining the distances of displacement u, v of the $\nu$-th and $\mu$-th lens groups, based on the foregoing explanation. Gaussian brackets can be utilized effectively for this purpose.

A Gaussian bracket for an arbitrary element array $a_1$, $a_2, \ldots, a_k$ is represented by $[a_1, a_2, \ldots, a_k]$ which is defined by:

$$\left. \begin{array}{l} [\,\,] = 1 \text{ (vacant Gaussian Bracket)} \\ [a] = a \\ [a_1, a_2, \ldots, a_n] = a_1[a_2, a_3, \ldots, a_n] + [a_3, \ldots, a_n] \end{array} \right\} \qquad (2)$$

From the above definition there can be developed various expansions among which those useful for the following explanation are shown in the following:

$$\left. \begin{array}{l} [a_1, a_2, \ldots, a_n] = [a_1, \ldots, a_{n-1}]a_n + [a_1, \ldots, a_{n-2}] \\ \phantom{[a_1, a_2, \ldots, a_n]} = [a_1, \ldots, a_{\lambda-1}]a_\lambda [a_{\lambda+1}, \ldots, a_n] \\ \phantom{[a_1, a_2, \ldots, a_n] =} + [a_1, \ldots, a_{\lambda-1}, 0, a_{\lambda+1}, \ldots, a_n] \\ \phantom{[a_1, a_2, \ldots, a_n]} = [a_1, \ldots, a_\lambda][a_{\lambda+1}, \ldots, a_n] \\ \phantom{[a_1, a_2, \ldots, a_n] =} + [a_1, \ldots, a_{\lambda-1}][a_{\lambda+2}, \ldots, a_n] \end{array} \right\} \qquad (3)$$

Also:

$$\left. \begin{array}{l} [a_1, a_2, \ldots, a_{\lambda+1}, 0, a_{\lambda+1}, \ldots, a_n] \\ = [a_1, \ldots, a_{\lambda+2}a_{\lambda-1} + a_{\lambda+1}, a_{\lambda+2}, \ldots, a_n] \end{array} \right\} \qquad (4)$$

This Gaussian bracket, when applied to an optical system from the l-th lens group to the m-th lens group for arbitrary values of l and m ($\leq$l), can be correlated to the following four different paraxial parameters:

$$l_{Am} \equiv [\phi_l - e'_l \phi_{l+1}, -e'_{l+1}, \ldots, \phi_{m-1}, -e'_{m-1}] \\ l_{Bm} \equiv [-e'_l, \phi_{l+1}, -e'_{l+1}, \ldots, \phi_{m-1}, -e'_{m-1}] \\ l_{Cm} \equiv [\phi_l, -e'_l \phi_{l+1}, -e'_{l+1}, \ldots, \phi_{m-1}, -e'_{m-1}, \phi_m] \\ l_{Dm} \equiv [-e'_l, \phi_{l+1}, -e'_{l+1}, \ldots, \phi_{m-1}, -e'_{m-1}, \phi_m] \quad (5)$$

wherein there are defined $l_{Am} = l_{Dm} = 1, l_{Cm} = 1$ and $l_{Bm} = 0$ when $l < m$. Also there always stands the Helmholtz-Lagrange equation:

$$l_{Am} l_{Dm} - l_{Bm} l_{Cm} = 1 \quad (6)$$

These parameters $l_{Am}, l_{Bm}, l_{Cm}$ and $l_{Dm}$ satisfy the equations (2) to (4). For example from the first equation of (3) there can be obtained:

$$\begin{aligned} l_{Am} &= l_{Cm-1} \times (-e'_{m-1}) + l_{Am-1} \\ l_{Cm} &= l_{Am} \times (\phi_m) + l_{Cm-1} \end{aligned} \quad (7)$$

$$\begin{aligned} l_{Bm} &= l_{Dm-1} \times (-e'_{m-1}) + l_{Bm-1} \\ l_{Dm} &= l_{Bm} \times (\phi_m) + l_{Dm-1} \end{aligned} \quad (8)$$

From the foregoing basic relations and also from the paraxial imaging theory there can be derived the following relationship between $S_1$ and $S'_1$:

$$e_o' = \frac{\{1_{Dk} \times (-e_k') + 1_{Bk}\}}{1_{Ck} \times (-e_k') + 1_{Ak}} \quad (9)$$

Also the image magnification $\beta$ is related with $e'_k$ by:

$$\beta = 1_{Ck}(-e'_k) + 1_{Ak} \quad (10)$$

wherein $1_{Ak}, \ldots, 1_{Ck}$ are represented in the refractive power arrangement where the $\nu$-th and $\mu$-th lens groups are displaced by the necessary distances u and v.

By rewriting the equations (9) and (10) with the foregoing $e'_0, e'_k$ and $\beta$ there can be obtained the following basic equations for determining the relation between u and v:

$$\begin{aligned} \beta &= 1_{Ak+1}(u, v) \\ e'_o \times \beta &= 1_{Bk+1}(u, v) \end{aligned} \quad (11)$$

wherein $$\begin{aligned} 1_{Ak+1}(u, v) &\equiv [\phi_\nu - e'_1, \ldots, \phi_{\nu-1}, -(e'_{\nu-1} + u), \phi_\nu, \\ &\quad -(e'_\nu - u), \phi_{\nu+1}, \ldots, \phi_{\mu-1}, -(e'_{\mu-1} + v), \\ &\quad \phi_\mu, -(e'_\mu - v), \phi_{\mu+1}, \ldots, -lk'] \\ 1_{Bk+1}(u, v) &\equiv [-l'_1, \ldots, \phi_{\nu-1}, -(e'_{\nu-1} + u), \phi_\nu, \\ &\quad -(e'_\nu - u), \phi_{\nu+1}, \ldots, \phi_{\mu-1}, -(e_{\mu-1} + v), \\ &\quad \phi_\mu, -(e'_\mu - v), \phi_{\mu+1}, \ldots, -e'_k] \end{aligned} \quad (12)$$

By rewriting the right-hand terms of the equations (12) with respect to u and v, utilizing the basic equations (3) and (4) of the Guassian bracket, there can be obtained the following equations:

$$\begin{cases} 1_{Ak+1}(u, v) = F_1(u, v)^\mu A_{k+1} + F_2(u, v)^\mu B_{k+1} \\ 1_{Bk+1}(u, v) = \widetilde{F}_1(u, v)^\mu A_{k+1} + \widetilde{F}_2(u, v)^\mu B_{k+1} \end{cases} \quad (13)$$

wherein:

$$\begin{cases} F_1(u, v) = f_1(u)g_1(v) + f_2(u)h_1(v) \\ F_2(u, v) = f_1(u)g_2(v) + f_2(u)h_2(v) \end{cases} \quad (14)$$

$$\begin{cases} \widetilde{F}_1(u, v) = \widetilde{f}_1(u)g_1(v) + \widetilde{f}_2(u)h_1(v) \\ \widetilde{F}_2(u, v) = \widetilde{f}_1(u)g_2(v) + \widetilde{f}_2(u)h_2(v) \end{cases} \quad (15)$$

$$\begin{cases} f_1(u) \equiv -{}^1C_{\nu-1}\phi_\nu u^2 + {}^1A_\nu\phi_\nu u + {}^1A_\nu \\ f_2(u) \equiv -{}^1C_{\nu-1}\phi_\nu u + {}^1C_\nu \end{cases} \quad (16)$$

$$\begin{cases} \widetilde{f}_1(u) \equiv -{}^1D_{\nu-1}\phi_\nu u^2 + {}^1B_\nu\phi_\nu u + {}^1B_\nu \\ \widetilde{f}_2(u) \equiv -{}^1D_{\nu-1}\phi_\nu u + {}^1D_\nu \end{cases} \quad (17)$$

$$\begin{cases} g_1(v) \equiv -{}^{\nu+1}C_{\mu-1}\phi_\mu v^2 + {}^{\nu+1}A_\mu\phi_\mu v + {}^{\nu+1}A_\mu \\ g_2(v) \equiv {}^{\nu+1}C_{\mu-1}(\phi_\mu v)^2 - {}^{\nu+1}C_\mu(\phi_\mu v) + {}^{\nu+1}C_{\mu-1} \end{cases} \quad (18)$$

$$\begin{cases} h_1(v) \equiv -{}^\nu D_{\mu-1}\phi_\mu v^2 + {}^\nu B_\mu\phi_\mu v + {}^\nu B_\mu \\ h_2(v) \equiv {}^\nu D_{\mu-1}(\phi_\mu v)^2 - {}^\nu D_\mu(\phi_\mu v) + {}^\nu D_{\mu-1} \end{cases} \quad (19)$$

Between the foregoing functions there stand:

$$\begin{cases} F_1(u, v)\widetilde{F}_2(u, v) - \widetilde{F}_1(u, v)F_2(u, v) = 1 \\ f_1(u)\widetilde{f}_2(u) - \widetilde{f}_1(u)f_2(u) = 1 \\ g_1(v)h_2(v) - g_2(v)h_1(v) = 1 \end{cases} \quad (20)$$

and:

$$\begin{cases} {}^\mu A_{k+1} \equiv {}^\mu C_k \times \{-e_k'\} + {}^\mu A_k \\ {}^\mu B_{k+1} \equiv {}^\mu D_k \times \{-e_k'\} + {}^\mu B_k \end{cases} \quad (21)$$

All the Gussian Bracket parameters in the foregoing equations (15)–(19) and (21) relate to the initial state wherein $u = v = 0$. In this manner the right-hand term of the basic equation (11) is rewritten by the amounts of displacement u, s and $e'_k$ and thus are represented by the functions of u and v of the same order, second order at maximum.

Therefore it suffices to solve two equations of (11) simultaneously with respect to u and v.

For this purpose the equations (11) are rewritten as follows:

$$\begin{cases} \beta = f_1(u)G(v) + f_2(u)H(v) \\ e'_o \times \beta = \widetilde{f}_1(u)G(v) + \widetilde{f}_2(u)H(v) \end{cases} \quad (11')$$

wherein:

$$\begin{cases} G(v) \equiv g_1(v)^\mu A_{k+1} + g_2(v)^\mu B_{k+1} \\ H(v) \equiv h_1(v)^\mu A_{k+1} + h_2(v)^\mu B_{k+1} \end{cases} \quad (22)$$

wherein G(v) and H(v) are both second-order functions of v. By solving the equations (11') with respect to G(v) and H(v) and separating the functions of u and v respectively to the right-hand terms and left-hand term by the help of the equations (20) there can be obtained:

$$\begin{cases} G(v) = \beta\{\widetilde{f}_2(u) - e_o' \times f_2(u)\} \\ H(v) = -\beta\{\widetilde{f}_1(u) - e_o' \times f_1(u)\} \end{cases} \quad (23)$$

As the left-hand term and the right-hand term of the equations (23) are respectively second-order functions of u and v, it is not difficult to determine u and v from these equations by ordinary analytical method. For example the first equation is solved as a second-order equation for v, and the thus determined result is introduced into the second equation to obtain a fourth-order function for u. It is easily possible to solve such equation in a numerical calculation. In such solution there will be obtained four real values of u, for each of which there will be obtained two real values of v, or eight real sets of u and v. In practice it is easily possible to find, from these sets, a set of u and v satisfying the initial state, namely satisfying that v=0 when u=0, by means of ordinary methods, or plotting all the real solutions with respect to $e'_o$.

In case of an imaging lens system wherein $\mu = \nu + 1$, i.e. two movable lens groups are mutually adjacent, the first one of the equations (23) becomes composed of first-order functions of u and v since $^{\nu+1}C_{\mu-1} \equiv 0$. Such structure is frequently found in so-called zoom lens, and it will be apparent that such structure is advantageously adaptable to the imaging lens system of the present invention. Also it will be apparent from the foregoing analysis that the imaging lens system 21 can be composed solely of two movable lens groups at minimum.

The following explains the lens system allowing alteration of the copying magnification. Enlarged or reduced copying in addition to the ordinary real-size copying can be achieved, for example, firstly by axially displacing all or a part of the lens groups (hereinafter called stationary lens groups) in the imaging optical system other than the aforementioned lens groups for path-length compensation, secondly by a zooming function achieved by a zoom lens constituting all or a part of said stationary lens groups in the imaging optical system, thirdly by interchanging all or a part of said stationary lens groups with other lens groups, fourthly by axially displacing a part of said stationary lens groups and inserting other lenses, or fifthly by extracting a part of said stationary lens groups from the imaging optical system. Such change in image magnification generally involves a certain change in the back-focus length of the imaging optical system, but such change can be compensated for example by displacing a mirror positioned between the imaging optical system and the photosensitive member.

The following Table 1 shows the refractive power arrangement of an embodiment of the imaging optical system adapted for use in the present invention, said system being composed, from the object side, of a first lens group of a positive power, second and third lens groups of negative powers and a fourth lens group of a positive power, wherein said second and third lens groups being movable for the compensation of optical path length while said first and fourth lens groups are stationary. $e_i$ is the distance between the principal points of the i-th lens group and the (i+1)-th lens group.

TABLE 1

|  | Power $\phi$ (l/f) | Distance between principal points |
|---|---|---|
| 1st lens group | 0.007 | $e_1$ 70 |
| 2nd lens group | −0.01 | $e_2$ 25 |
| 3rd lens group | −0.01 | $e_3$ 70 |
| 4th lens group | 0.007 |  |

Figure 4:
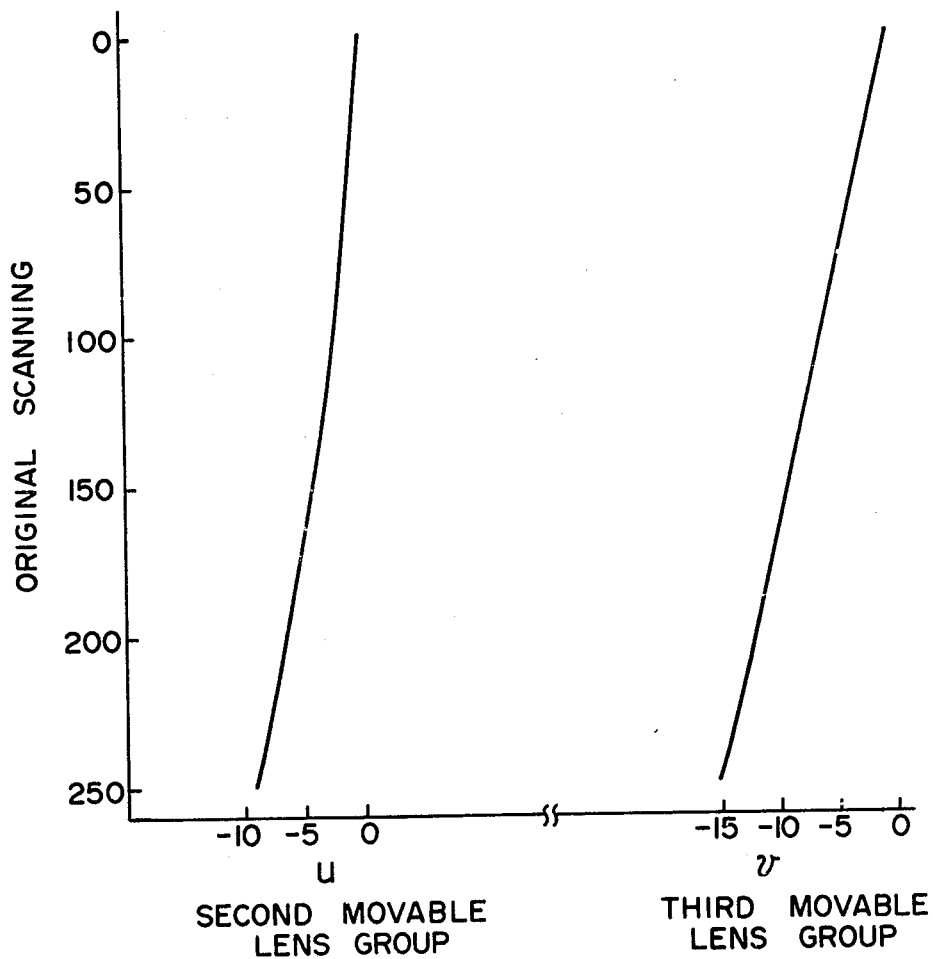
FIG. 4 is a view showing the displacement of the path-length compensating lens in an embodiment of the imaging lens system of the copying apparatus of the present invention.

Table 2 shows the change in the distance S1 from the original to the first lens group, the amount of displacement u of the second group, the amount of displacement v of the third group, the change in the back-focus distance $S_1'$ and the change in the image magnification $\beta$ as a function of the amount of displacement x of the movable mirror 16 from the home position thereof farthest from the imaging lens system 21, and FIG. 4 graphically shows said displacements u and v as a function of said displacement x, wherein said displacements u and v are regarded as negative toward the original side.

TABLE 2

| X | $S_1$ | u | v | $S'_1$ | $\beta$ |
|---|---|---|---|---|---|
| 0. | 894.74 | 0. | 0. | 894.74 | −1. |
| 25. | 869.74 | −0.6011 | −1.4836 | 894.74 | −1. |
| 50. | 844.74 | −1.2569 | −2.9783 | 894.74 | −1. |
| 75. | 819.74 | −1.9726 | −4.4834 | 894.74 | −1. |
| 100. | 794.74 | −2.7538 | −5.9976 | 894.74 | −1. |
| 125. | 769.74 | −3.6068 | −7.5197 | 894.74 | −1. |
| 150. | 744.74 | −4.5384 | −9.0480 | 894.74 | −1. |
| 175. | 719.74 | −5.5565 | −10.5807 | 894.74 | −1. |
| 200. | 694.74 | −6.6696 | −12.1155 | 894.74 | −1. |
| 225. | 669.74 | −7.8874 | −13.6495 | 894.74 | −1. |
| 250. | 644.74 | −9.2207 | −15.1798 | 894.74 | −1. |

As explained in the foregoing, the copying apparatus of the present invention features at least a movable mirror for scanning the surface of a planar stationary original and an imaging optical system for compensating the change in the optical path length resulting from the displacement of said movable mirror, and allows the obtaining of a copy of an improved image quality with a simplified actuating mechanism.

What we claim is:

1. A copying apparatus for copying a stationary original, comprising:
    a planar stationary original support table;
    at least one mirror linearly moveable in a plane parallel to said original support table to scan the surface of an original placed on said original support table;
    a photosensitive member for receiving the information of said surface of the original; and
    an imaging lens system including plural lens groups, said system being provided between said mirror and said photosensitive member, wherein a constant magnification of the image on said photosensitive member and an optical conjugate relationship between the original and said photosensitive member are maintained only by displacing at least one of said lens groups along its optical axis in synchronism with the displacement of said mirror.

2. A copying apparatus according to claim 1, wherein at least a part of said imaging optical system, other than said aforementioned lens group which is displaceable in synchronization with the displacement of said mirror, is interchangeable with other lens groups for changing the image magnification.

3. A copying apparatus according to claim 1, wherein at least a part of said imaging optical system, other than said aforementioned lens group which is displaceable in synchronization with the displacement of said mirror, is rendered axially displaceable for changing the image magnification.

4. A copying apparatus for copying a stationary original, comprising:
    a planar stationary original support table;
    at least one mirror linearly moveable in a plane parallel to said original support table to scan the surface of an original placed on said original support table;
    a photosensitive member for receiving the information of said surface of the original from said mirror; and
    an imaging lens system including plural lens groups, said system being provided between said mirror and said photosensitive member, wherein a constant magnification of the image on said photosensitive member and an optical conjugate relationship between the original and said photosensitive member are maintained only by displacing at least two of said lens groups in the direction of the optical axes thereof in synchronization with the displacement of said mirror.

5. A copying apparatus for copying a stationary original, comprising:

a planar stationary original support table;

at least one mirror linearly moveable in a plane parallel to said original support table for scanning the surface of an original placed on said original support table;

a photosensitive member for receiving the information of said surface of the original; and an imaging lens system including plural lens groups, said system being provided between said mirror and said photosensitive member, wherein a constant magnification of the image on said photosensitive member and an optical conjugate relationship between the original and said photosensitive member are maintained only by moving at least one of said lens groups in the direction of the optical axis thereof in synchronization with the displacement of said mirror.

* * * * *